(12) United States Patent
Liu et al.

(10) Patent No.: US 11,811,475 B2
(45) Date of Patent: Nov. 7, 2023

(54) METHOD AND ACCESS NETWORK NODE FOR BEAM CONTROL

(71) Applicant: Telefonaktiebolaget LM Ericsson (publ), Stockholm (SE)

(72) Inventors: Kangqi Liu, Beijing (CN); Yipeng Zhang, Beijing (CN); Huaisong Zhu, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/782,205

(22) PCT Filed: Dec. 6, 2019

(86) PCT No.: PCT/CN2019/123731
§ 371 (c)(1),
(2) Date: Jun. 3, 2022

(87) PCT Pub. No.: WO2021/109135
PCT Pub. Date: Jun. 10, 2021

(65) Prior Publication Data
US 2023/0032895 A1    Feb. 2, 2023

(51) Int. Cl.
*H04B 7/06* (2006.01)
*H04W 72/51* (2023.01)
(Continued)

(52) U.S. Cl.
CPC ......... *H04B 7/0617* (2013.01); *H04B 7/0452* (2013.01); *H04W 72/046* (2013.01); *H04W 72/21* (2023.01); *H04W 72/51* (2023.01)

(58) Field of Classification Search
CPC . H04B 7/0617; H04B 7/0452; H04W 72/046; H04W 72/21; H04W 72/51
See application file for complete search history.

(56) References Cited

U.S. PATENT DOCUMENTS

2009/0274074 A1    11/2009  Astely
2011/0019759 A1*   1/2011  Stager ................. H04L 25/0228
                                                                375/267
(Continued)

FOREIGN PATENT DOCUMENTS

CN    103929281 A    7/2014
CN    108566255 A    9/2018
(Continued)

OTHER PUBLICATIONS

Ericsson, "Enhancements to multi-beam operation", 3GPP TSG-RAN WG1 Meeting #96, Tdoc R1-1903231, Athens, Greece, Feb. 25-Mar. 1, 2019, 1-15.
(Continued)

*Primary Examiner* — Vineeta S Panwalkar
(74) *Attorney, Agent, or Firm* — Murphy, Bilak & Homiller, PLLC

(57) ABSTRACT

A method and an access network node are disclosed for beam control. According to an embodiment, the access network node determines first spatial domain information of a channel between a first terminal device and the access network node, based on second spatial domain information of the channel estimated by uplink signals received previously from the first terminal device at multiple time points. The access network node determines beamforming weights for the first terminal device based on the first spatial domain information.

20 Claims, 15 Drawing Sheets

Determine first spatial domain information of a channel between a first terminal device and the access network node, based on second spatial domain information of the channel estimated by uplink signals received previously from the first terminal device at multiple time points —502

Determine beamforming weights for the first terminal device based on the first spatial domain information —504

(51) Int. Cl.
*H04W 72/21* (2023.01)
*H04B 7/0452* (2017.01)
*H04W 72/044* (2023.01)

(56) References Cited

U.S. PATENT DOCUMENTS

| | | |
|---|---|---|
| 2012/0014425 A1 | 1/2012 | Zhuang et al. |
| 2013/0322280 A1* | 12/2013 | Pi .................. H04W 56/0005 370/252 |
| 2016/0269157 A1 | 9/2016 | Soriaga et al. |
| 2017/0373743 A1 | 12/2017 | Park et al. |
| 2019/0229953 A1 | 7/2019 | Hu et al. |

FOREIGN PATENT DOCUMENTS

| | | |
|---|---|---|
| CN | 108923834 A | 11/2018 |
| WO | 2013056435 A1 | 4/2013 |

OTHER PUBLICATIONS

ZTE, "Consideration on Multi-user beamforming", 3GPP TSG RAN WG1 Meeting #56, R1-090636, Athens, Greece, Feb. 9-13, 2009, 1-4.

* cited by examiner

METHOD AND ACCESS NETWORK NODE FOR BEAM CONTROL

TECHNICAL FIELD

Embodiments of the disclosure generally relate to wireless communication, and, more particularly, to a method and an access network node for beam control.

BACKGROUND

This section introduces aspects that may facilitate better understanding of the present disclosure. Accordingly, the statements of this section are to be read in this light and are not to be understood as admissions about what is in the prior art or what is not in the prior art.

Sounding reference signals (SRSs) may be transmitted in uplink to enable an evolved node base station (eNB) to estimate the channel state information (CSI) over a range of frequencies in long term evolution (LTE) system. The estimation of the CSI can assist the eNB scheduler to properly allocate radio resource to the user equipment (UE). The SRS transmission can also be used to support downlink beamforming. Currently, the channel is regarded as unchanged during the whole configured SRS period. Therefore, the previous estimated SRS channel information will be used in the downlink (DL) modules until the next estimated SRS channel information arrives.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide an improved solution for beam control.

According to a first aspect of the disclosure, there is provided a method performed by an access network node. The method may comprise determining first spatial domain information of a channel between a first terminal device and the access network node, based on second spatial domain information of the channel estimated by uplink signals received previously from the first terminal device at multiple time points. The method may further comprise determining beamforming weights for the first terminal device based on the first spatial domain information.

In this way, the performance of the beam (or spatial precoding) for the first terminal device can be improved.

In an embodiment of the disclosure, determining the first spatial domain information may comprise performing data dimension reduction on the second spatial domain information such that the first spatial domain information is obtained.

In an embodiment of the disclosure, the method may further comprise determining a mobility level of the first terminal device based on the second spatial domain information. The first spatial domain information may be determined based on the mobility level of the first terminal device.

In an embodiment of the disclosure, the beamforming weights may be determined such that signal to interference plus noise ratio (SINR) for the first terminal device is maximized.

In an embodiment of the disclosure, the beamforming weights may be used for performing single user multiple-input multiple-output (SU-MIMO) for the first terminal device.

In an embodiment of the disclosure, the first terminal device may be one of multiple terminal devices. The beamforming weights may be determined such that a space indicated by the first spatial domain information corresponding to the first terminal device is a null space of another space indicated by first spatial information corresponding to other terminal device among the multiple terminal devices.

In an embodiment of the disclosure, the determining of the first spatial domain information and the determining of the beamforming weights may be performed for each of the multiple terminal devices.

In an embodiment of the disclosure, the beamforming weights may be used for performing multi-user MIMO (MU-MIMO) for the multiple terminal devices.

In an embodiment of the disclosure, determining the mobility level of the first terminal device based on the second spatial domain information may comprise determining multiple values of channel coherence for the first terminal device based on the second spatial domain information. Determining the mobility level of the first terminal device based on the second spatial domain information may further comprise determining the mobility level of the first terminal device based on the multiple values of channel coherence.

In an embodiment of the disclosure, the mobility level of the first terminal device may be determined based on a probability at which the channel coherence is above a predetermined channel coherence.

In an embodiment of the disclosure, when the probability is smaller than a first predetermined threshold, the first terminal device may be determined to move with a vehicle speed or higher speed. When the probability is above the first predetermined threshold and smaller than a second predetermined threshold, the first terminal device may be determined to move with a pedestrian speed. When the probability is above the second predetermined threshold, the first terminal device may be determined to be stationary.

In an embodiment of the disclosure, a dimension of the first spatial domain information may be increased as the mobility level of the first terminal device increases.

In an embodiment of the disclosure, the first spatial domain information may be determined based further on at least one of: a configuration about sounding reference signal (SRS) period; and a configuration about an antenna array of the access network node.

In an embodiment of the disclosure, a dimension of the first spatial domain information may be increased as the SRS period of the first terminal device is increased.

In an embodiment of the disclosure, a dimension of the first spatial domain information may be increased as a number of antenna elements contained in the antenna array is increased.

In an embodiment of the disclosure, the first spatial domain information may be determined by using at least one of: principal component analysis (PCA); and support vector machine (SVM) or kernel based compression.

In an embodiment of the disclosure, determining the beamforming weights for the first terminal device may comprise, for a matrix C whose components are the first spatial domain information corresponding to the multiple terminal devices, calculating a product between C and an inverse matrix of $C^H C$, where $C^H$ is a conjugate transpose matrix of C. Determining the beamforming weights for the first terminal device may further comprise determining, from the product, one or more vectors corresponding to the first terminal device, as the beamforming weights for the first terminal device.

In an embodiment of the disclosure, the uplink signals are SRSs.

In an embodiment of the disclosure, the second spatial domain information is represented by multiple channel vectors.

According to a second aspect of the disclosure, there is provided an access network node. The access network node may comprise at least one processor and at least one memory. The at least one memory may contain instructions executable by the at least one processor, whereby the access network node may be operative to determine first spatial domain information of a channel between a first terminal device and the access network node, based on second spatial domain information of the channel estimated by uplink signals received previously from the first terminal device at multiple time points. The access network node may be further operative to determine beamforming weights for the first terminal device based on the first spatial domain information.

In an embodiment of the disclosure, the instructions may be executable by the at least one processor, whereby the access network node may be operative to determine the first spatial domain information by performing data dimension reduction on the second spatial domain information such that the first spatial domain information is obtained.

In an embodiment of the disclosure, the instructions may be executable by the at least one processor, whereby the access network node may be further operative to determine a mobility level of the first terminal device based on the second spatial domain information. The instructions may be executable by the at least one processor, whereby the access network node may be operative to determine the first spatial domain information based on the mobility level of the first terminal device.

In an embodiment of the disclosure, the instructions may be executable by the at least one processor, whereby the access network node may be operative to determine the beamforming weights such that SINR for the first terminal device is maximized.

In an embodiment of the disclosure, the beamforming weights may be used for performing SU-MIMO for the first terminal device.

In an embodiment of the disclosure, the first terminal device may be one of multiple terminal devices. The instructions may be executable by the at least one processor, whereby the access network node may be operative to determine the beamforming weights such that a space indicated by the first spatial domain information corresponding to the first terminal device is a null space of another space indicated by first spatial information corresponding to other terminal device among the multiple terminal devices.

In an embodiment of the disclosure, the instructions may be executable by the at least one processor, whereby the access network node may be operative to determine the first spatial domain information and determine the beamforming weights for each of the multiple terminal devices.

In an embodiment of the disclosure, the beamforming weights may be used for performing MU-MIMO for the multiple terminal devices.

In an embodiment of the disclosure, the instructions may be executable by the at least one processor, whereby the access network node may be operative to determine the mobility level of the first terminal device based on the second spatial domain information by determining multiple values of channel coherence for the first terminal device based on the second spatial domain information. The access network node may be operative to determine the mobility level of the first terminal device based on the second spatial domain information by determining the mobility level of the first terminal device based on the multiple values of channel coherence.

In an embodiment of the disclosure, the instructions may be executable by the at least one processor, whereby the access network node may be operative to determine the mobility level of the first terminal device based on a probability at which the channel coherence is above a predetermined channel coherence.

In an embodiment of the disclosure, when the probability is smaller than a first predetermined threshold, the first terminal device may be determined to move with a vehicle speed or higher speed. When the probability is above the first predetermined threshold and smaller than a second predetermined threshold, the first terminal device may be determined to move with a pedestrian speed. When the probability is above the second predetermined threshold, the first terminal device may be determined to be stationary.

In an embodiment of the disclosure, a dimension of the first spatial domain information may be increased as the mobility level of the first terminal device increases.

In an embodiment of the disclosure, the instructions may be executable by the at least one processor, whereby the access network node may be operative to determine the first spatial domain information based further on at least one of: a configuration about SRS period; and a configuration about an antenna array of the access network node.

In an embodiment of the disclosure, a dimension of the first spatial domain information may be increased as the SRS period of the first terminal device is increased.

In an embodiment of the disclosure, a dimension of the first spatial domain information may be increased as a number of antenna elements contained in the antenna array is increased.

In an embodiment of the disclosure, the instructions may be executable by the at least one processor, whereby the access network node may be operative to determine the first spatial domain information by using at least one of: PCA; and SVM or kernel based compression.

In an embodiment of the disclosure, the instructions may be executable by the at least one processor, whereby the access network node may be operative to determine the beamforming weights for the first terminal device by: for a matrix C whose components are the first spatial domain information corresponding to the multiple terminal devices, calculating a product between C and an inverse matrix of $C^H C$, where $C^H$ is a conjugate transpose matrix of C. The access network node may be operative to determine the beamforming weights for the first terminal device by determining, from the product, one or more vectors corresponding to the first terminal device, as the beamforming weights for the first terminal device.

In an embodiment of the disclosure, the uplink signals may be SRSs.

In an embodiment of the disclosure, the second spatial domain information may be represented by multiple channel vectors.

According to a third aspect of the disclosure, there is provided a computer program product. The computer program product may comprise instructions which when executed by at least one processor, cause the at least one processor to perform the method according to the above first aspect.

According to a fourth aspect of the disclosure, there is provided a computer readable storage medium. The computer readable storage medium may comprise instructions which when executed by at least one processor, cause the at least one processor to perform the method according to the above first aspect.

According to a fifth aspect of the disclosure, there is provided an access network node. The access network node may comprise a first determination module for determining first spatial domain information of a channel between a first terminal device and the access network node, based on second spatial domain information of the channel estimated by uplink signals received previously from the first terminal device at multiple time points. The access network node may further comprise a second determination module for determining beamforming weights for the first terminal device based on the first spatial domain information.

BRIEF DESCRIPTION OF THE DRAWINGS

These and other objects, features and advantages of the disclosure will become apparent from the following detailed description of illustrative embodiments thereof, which are to be read in connection with the accompanying drawings.

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

References in the specification to "one embodiment", "an embodiment", "an example embodiment", and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Some of the embodiments described separately or independently hereafter may also be implemented in combination depending on various application scenarios.

As mentioned above, currently, the channel is regarded as unchanged during the whole configured SRS period. Therefore, the previous estimated SRS channel information will be used in the DL modules until the next estimated SRS channel information arrives. However, the real channel coherence time may be much shorter than the configured SRS period. For example, the default value of SRS period is 20 ms in some LTE product. Even for new radio (NR), due to the nature time division duplexing (TDD) pattern and SRS resource restrictions, the minimal SRS period is still at the level of several milliseconds. When the channel changes too much over time, then there will be a large channel estimation error in each transmission time interval (TTI) based on the previous estimated SRS channel information.

To clearly define this change of channel, the channel coherence may be defined as:

$$\rho_u(t, k) = \frac{|H_u^H(t, k) \cdot H_u(t + \Delta t, k)|}{|H_u(t, k)||H_u(t + \Delta t, k)|},$$

where $H_u(t)=[H_{u,0}(t) \; H_{u,N-1}(t)]^T$ has the dimension of N×1 and is defined as the channel vector based on SRS channel estimation at a fixed physical resource block (PRB) k, u is the user index, t is the time when SRS is transmitted, n is the antenna index, $\Delta t$ is the SRS period, and $H_u^H$ is a conjugate transpose matrix of $H_u$. When $\rho_u(t,k)=1$, it means that the SRS channel estimations at time slot t and $\Delta t$ remain unchanged despite a phase shift. When $\rho_u(t,k)=0$, it means that the SRS channel estimations at time slot t and $\Delta t$ are orthogonal.

Figure 1:
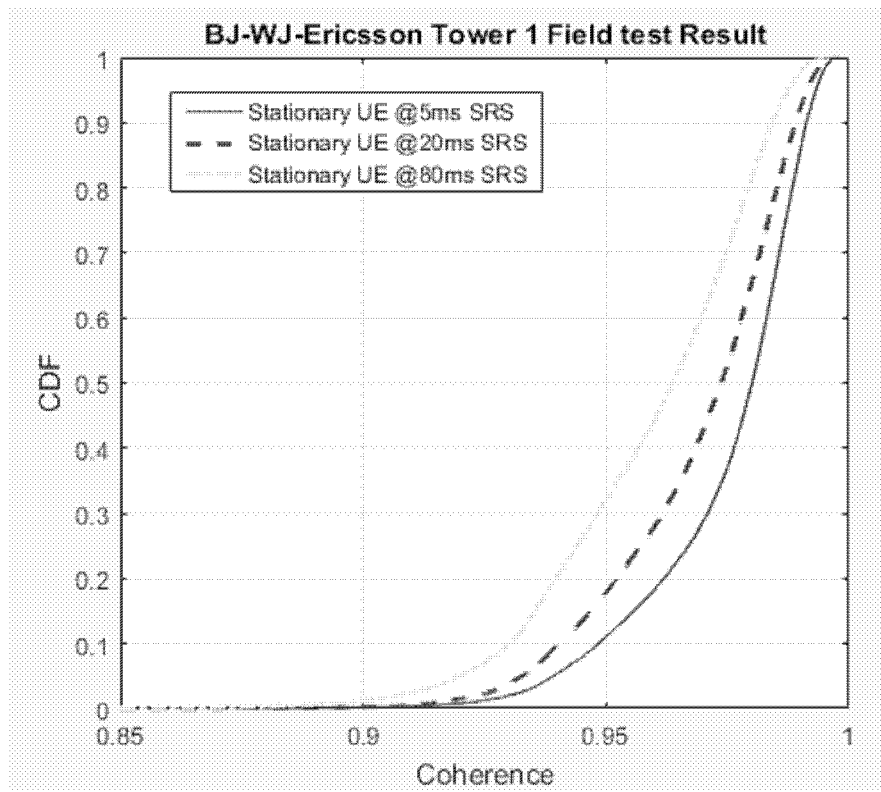
FIG. 1 is a diagram illustrating the cumulative distribution functions (CDFs) of channel coherence over different SRS periods for a stationary UE.

Channel coherence is highly related with the detailed environment. The inventors of the disclosure have measured it in field by real massive MIMO product. In the first scenario, the UE was located at ground and there were no persons or mobility objects around the UE within 5 meters. This scenario may be named as "stationary UE" scenario. The cumulative distribution functions (CDFs) of the channel coherence over different SRS periods are illustrated in FIG. 1. As shown, the channel coherence in time domain for the "stationary UE" scenario is very high no matter the configured SRS period is 5 ms, 20 ms or 80 ms.

Figure 2:
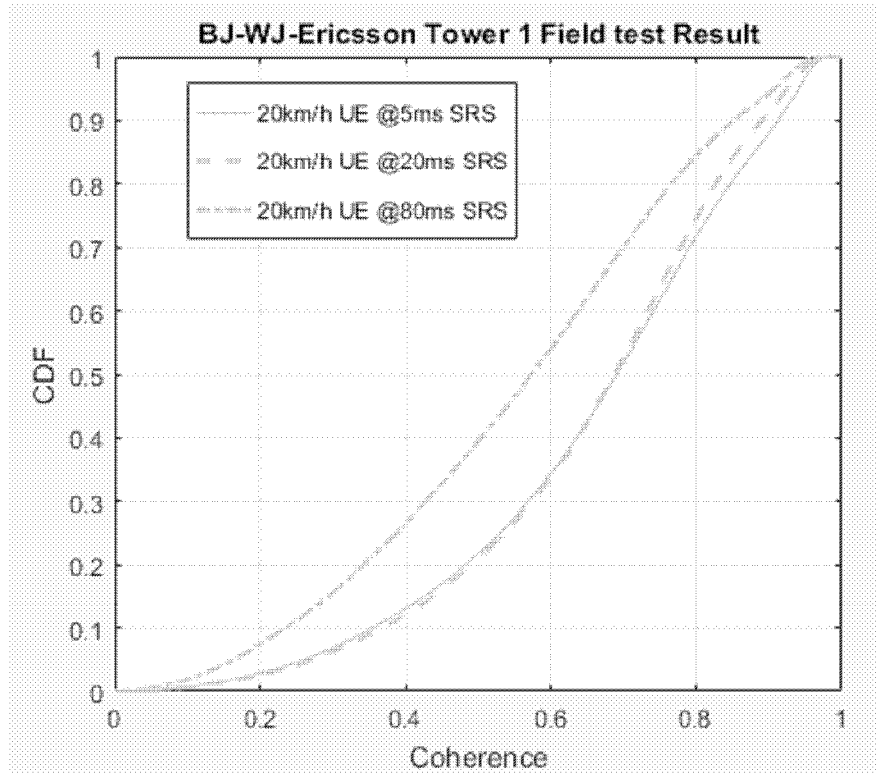
FIG. 2 is a diagram illustrating the CDFs of channel coherence over different SRS periods for a 20 km/h UE.

In the second scenario, the UE was located in car and the car was moving at a speed around 20 km/h. This scenario may be named as "20 km/h UE" scenario. The CDFs of the channel coherence over different SRS periods are illustrated in FIG. 2. As shown, the channel coherence in time domain for the "20 km/h UE" scenario is very low no matter the configured SRS period is 5 ms, 20 ms or 80 ms.

Figure 3:
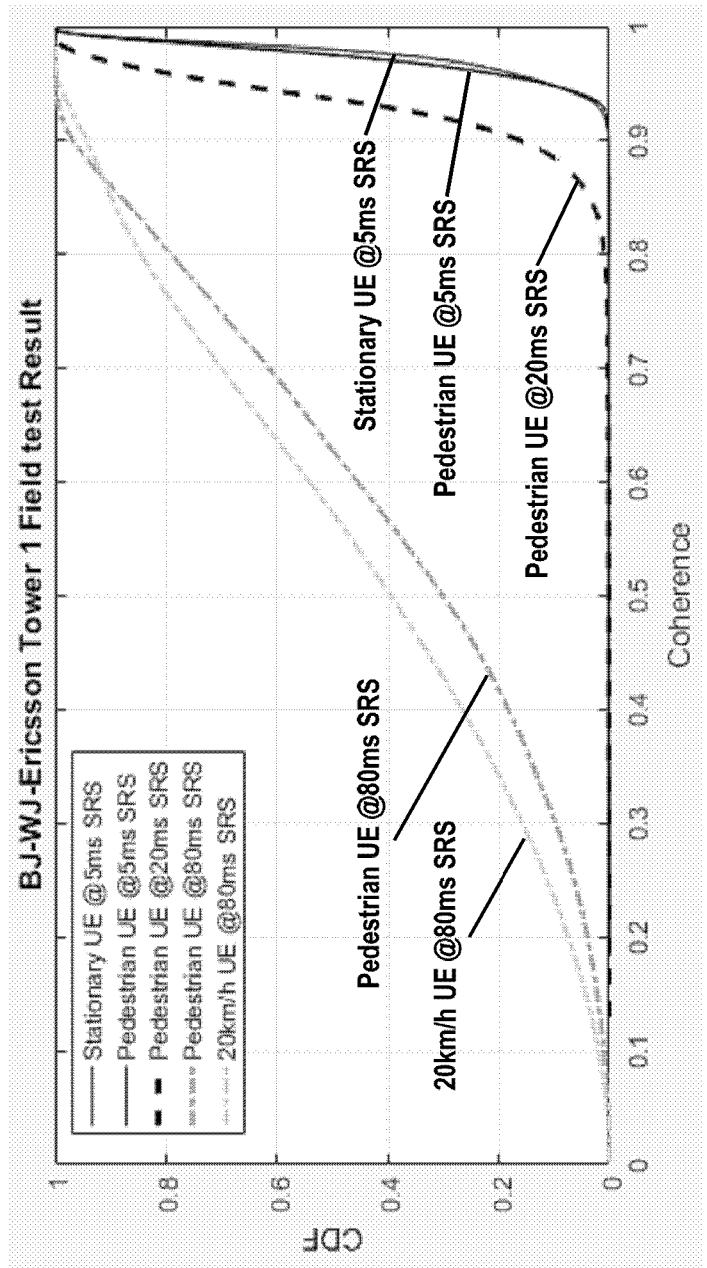
FIG. 3 is a diagram illustrating the CDFs of channel coherence over different SRS periods for a pedestrian UE.
Figure 4A:
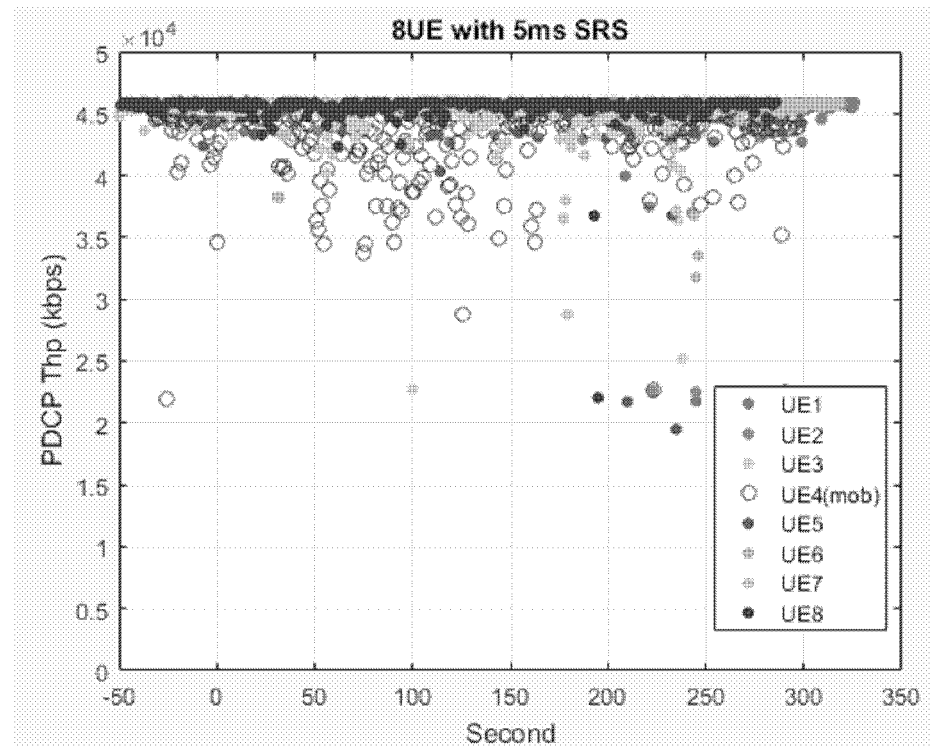
FIGS. 4A-4D are diagrams illustrating the throughputs over different SRS periods.
Figure 4B:
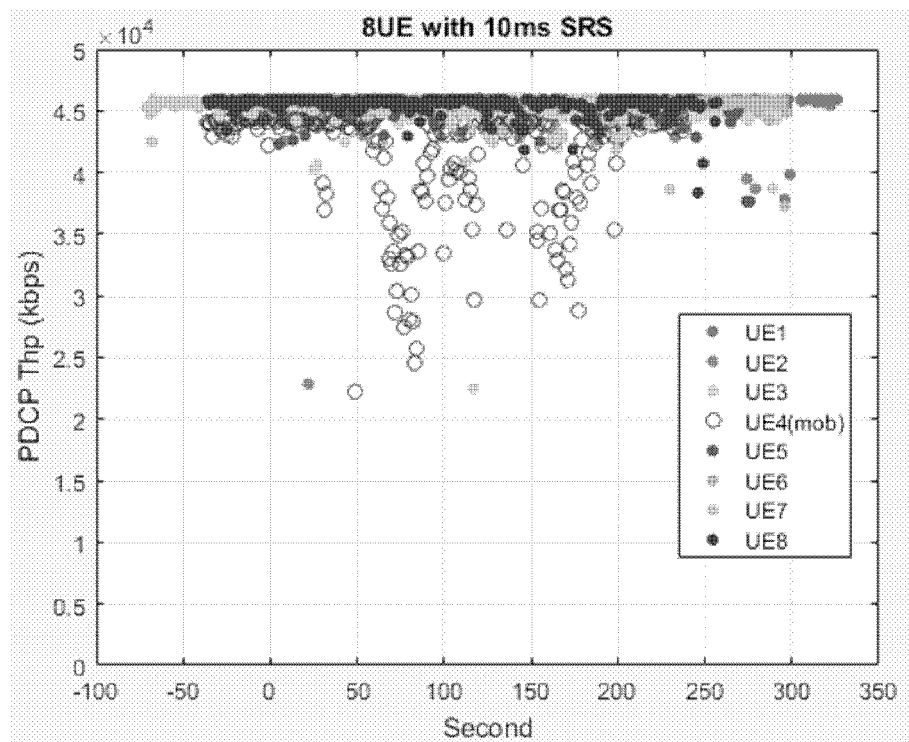
Figure 4C:
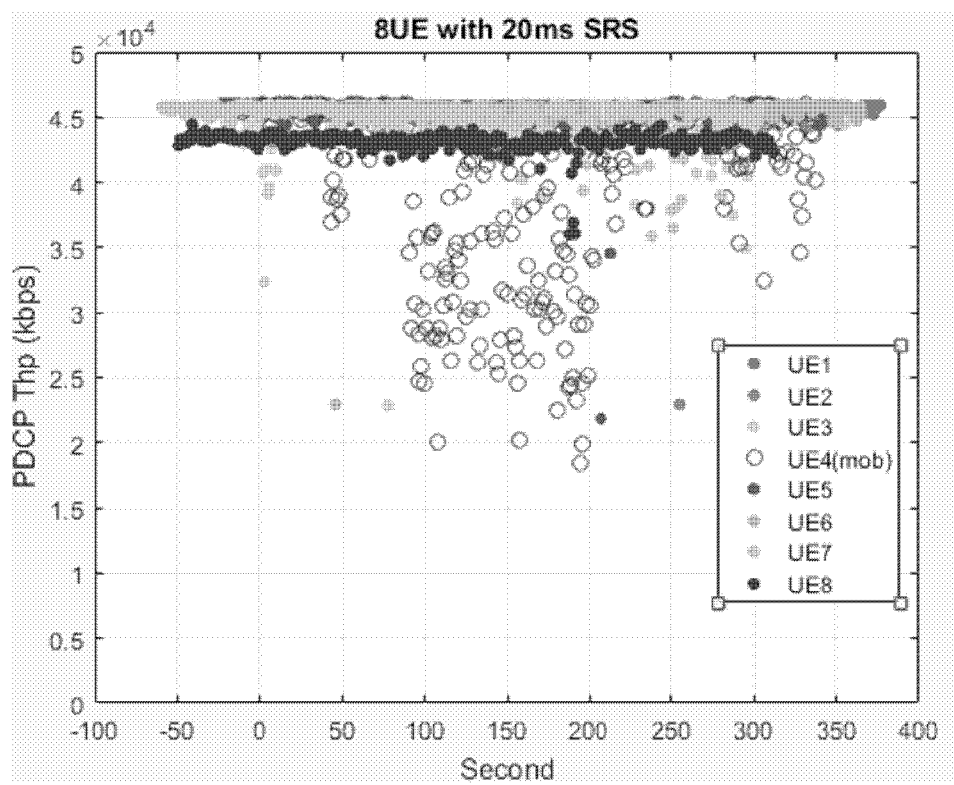
Figure 4D:
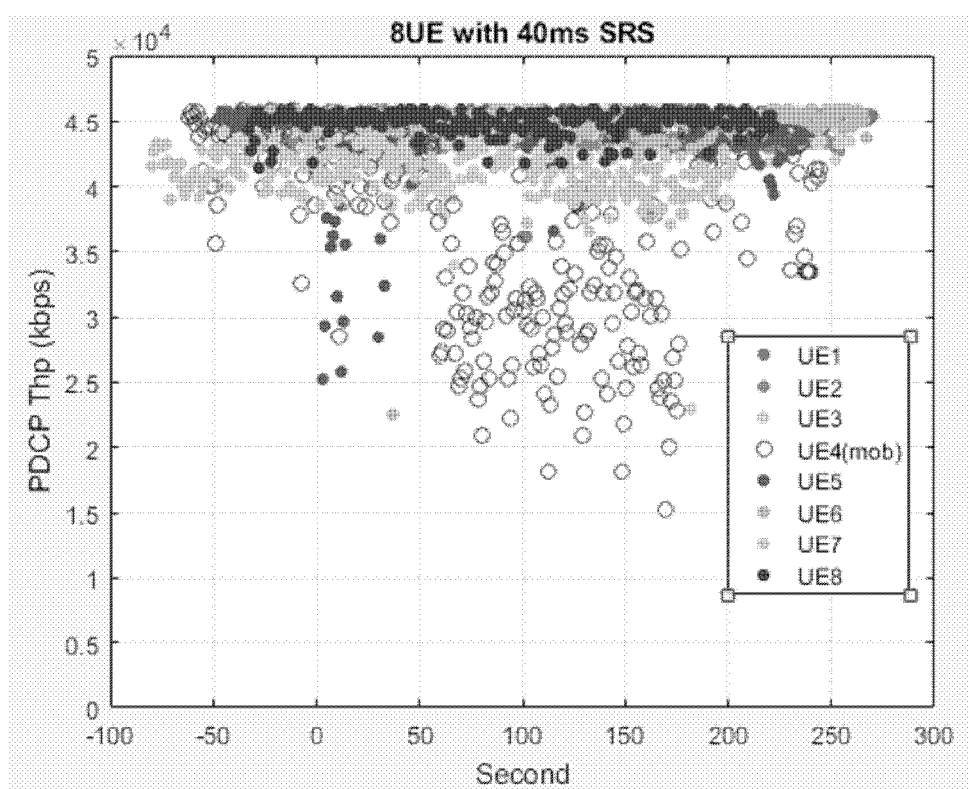

In the third scenario, the UE was held at the tester's hand and the tester was walking around at a speed around 3 km/h. This scenario may be named as "pedestrian UE" scenario. The CDFs of the channel coherence over different SRS periods are illustrated in FIG. 3. As shown, with 5 ms SRS period, the channel coherence in time domain for the "pedestrian UE" scenario is similar to that for the "stationary UE" scenario. With increased SRS period, the channel coherence dramatically decreases. When the SRS period increases to 80 ms, then it ruins the channel coherence and almost reaches the "20 km/h UE" scenario. In practical scenarios, a large number of UEs are in the "pedestrian UE" scenario and the "20 km/h UE" scenario. Thus, it would be desirable to deal with MU-MIMO (and possibly, SU-MIMO) in such scenarios.

Currently, the DL modules always use the previous estimated SRS channel information for signal processing. The inventors of the disclosure have measured the throughput performance in field by real LTE massive MIMO product. In the field testing, all UEs were stationary except one pedestrian UE. This pedestrian UE was stationary at first 60 seconds, and then moved around at a speed of 3 km/h for 60 seconds, then went back to stationary status for 60 seconds. The throughputs over different SRS periods for 8-layer MU-MIMO are illustrated in FIGS. 4A-4D. As shown, the longer SRS period leads to more performance loss with UE mobility. Specifically, there is a 12% performance loss when the SRS period is 5 ms while there is a 55% performance loss when the SRS period is 40 ms. This implies if SRS period is too large, even some UEs are configured with MU-MIMO, the throughput gain will be very limited or even less than no MU-MIMO mode.

In addition, UE with pedestrian speed or middle speed (like 20 km/h to 60 km/h) is a common MU-MIMO scenario, like urban railway line. Hundreds or even more than one thousand of passengers would be in urban railway cars, and with relatively high uplink and downlink traffic requirements. This would generate a typical hot spot, moving along the railway.

Due to the length of railway cars, this moving hot spot at one time instance could be served only by one or limited number of base stations because typical cell radius, even in dense urban, could reach several hundreds of miles. Thus, there would be limited methods to increase cell capacity but MU-MIMO. In this case, pilot MU-MIMO capacity potential for urban railway line is important and would be desirable for network operators.

With respect to MU-MIMO, in LTE/NR, the UE is equipped with at least 2 antennas to receive signals. The eNB or next generation node base station (gNB) maybe send multiple layers of data streams toward each UE. To enhance the desired DL signal and reduce the interference between users, the beamforming weights will be applied on the DL streams. In the following, the case where the eNB/gNB sends 2 layers of data streams toward each UE is considered as an example.

The DL signal model could be expressed as:

$$r(s,k)=H(s,k)W(p)s(s,k)+n(s,k),$$

where $H(s,k)$ is the channel vector based on SRS channel estimation at a fixed PRB k, $W(p)$ denotes the beamforming weights for all the streams, $s(s,k)$ is the DL streams for all the users which are allocated to occupy the same time-frequency resource, and $n(s,k)$ is the inter-cell interference and noise on all UE antennas.

The downlink streams $s(s,k)$ could be expressed as:

$$s(s,k) = \begin{bmatrix} s_0(s,k,0) \\ s_{L_0-1}(s,k,0) \\ s_0(s,k,1) \\ s_{L_1-1}(s,k,1) \\ \vdots \\ s_0(s,k,K-1) \\ s_{L_{K-1}-1}(s,k,K-1) \end{bmatrix},$$

where $s_l(s,k,u)$ is the data for the $l_{th}$ stream of user u and the stream number for user u is $L_u$. Each stream is beamformed with the beamforming weights $w_l(p, u)$ having the dimension of N×1, where p is the PRB index.

It is assumed that the beamforming weights are the same at least in one PRB. Then, the beamforming weights $W(p)$ for all the streams could be expressed as:

$$w(p)=[w_0(p,0),w_{L_0-1}(p,0),w_0(p,1),w_{L_1-1}(p,1),\ldots,w_0(p,K-1),w_{L_{K-1}-1}(p,K-1)].$$

The DL channel is $H(s,k)$ with the dimension 2K×N. Each UE is assumed to be equipped with 2 antennas. Then, $H(s,k)$ could be expressed as:

$$H(s,k) = \begin{bmatrix} h_0(s,k,0) \\ h_1(s,k,0) \\ h_0(s,k,1) \\ h_1(s,k,1) \\ \vdots \\ h_0(s,k,K-1) \\ h_1(s,k,K-1) \end{bmatrix},$$

where $h_m(s,k,u)$ is the frequency channel response vector for the UE antenna m ∈ {0, 1} with the dimension of 1×N.

The interference and noise $n(s,k)$ could be expressed as:

$$n(s,k) = \begin{bmatrix} n_0(s,k,0) \\ n_1(s,k,0) \\ n_0(s,k,1) \\ n_1(s,k,1) \\ \vdots \\ n_0(s,k,K-1) \\ n_1(s,k,K-1) \end{bmatrix},$$

where $n_m(s,k,u)$ is the noise on the $m_{th}$ antenna for the UE u. It includes the thermal noise and the noise from the neighbor cell.

Then, the UE received signal r(s,k) could be expressed as:

$$r(s, k) = \begin{bmatrix} r_0(s, k, 0) \\ r_1(s, k, 0) \\ r_0(s, k, 1) \\ r_1(s, k, 1) \\ \vdots \\ r_0(s, k, K-1) \\ r_1(s, k, K-1) \end{bmatrix},$$

where $r_m(s,k,u)$ is the received signal on the $m_{th}$ antenna of the user u. For the conciseness, the index (s,k) will be dropped with no ambiguity being caused. As a result, the received signal model could be expressed as:

$$\begin{bmatrix} r_0(0) \\ r_1(0) \\ r_0(1) \\ r_1(1) \\ \vdots \\ r_0(K-1) \\ r_1(K-1) \end{bmatrix} =$$

$$\begin{bmatrix} h_0(0) \\ h_1(0) \\ h_0(1) \\ h_1(1) \\ \vdots \\ h_0(K-1) \\ h_1(K-1) \end{bmatrix} \begin{bmatrix} w_0^T(0) \\ w_{L_0-1}^T(0) \\ w_0^T(1) \\ w_{L_1-1}^T(1) \\ \vdots \\ w_0^T(K-1) \\ w_{L_{K-1}-1}^T(K-1) \end{bmatrix}^T \begin{bmatrix} s_0(0) \\ s_{L_0-1}(0) \\ s_0(1) \\ s_{L_1-1}(1) \\ \vdots \\ s_0(K-1) \\ s_{L_{K-1}-1}(K-1) \end{bmatrix} + \begin{bmatrix} n_0(0) \\ n_1(0) \\ n_0(1) \\ n_1(1) \\ \vdots \\ n_0(K-1) \\ n_1(K-1) \end{bmatrix}.$$

For the user u, the received signal could be written as:

$$\begin{bmatrix} r_0(u) \\ r_1(u) \end{bmatrix} = \begin{bmatrix} h_0(u) \\ h_1(u) \end{bmatrix} \begin{bmatrix} w_0^T(0) \\ w_{L_0}^T(0) \\ w_0^T(1) \\ w_{L_0}^T(1) \\ \vdots \\ w_0^T(K-1) \\ w_{L_0}^T(K-1) \end{bmatrix}^T \begin{bmatrix} s_0(0) \\ s_{L_0-1}(0) \\ s_0(1) \\ s_{L_1-1}(1) \\ \vdots \\ s_0(K-1) \\ s_{L_{K-1}-1}(K-1) \end{bmatrix} + \begin{bmatrix} n_0(u) \\ n_1(u) \end{bmatrix}.$$

The useful signal for the user u is:

$$\begin{bmatrix} \tilde{s}_0(u) \\ \tilde{s}_1(u) \end{bmatrix} = \begin{bmatrix} h_0(u) \\ h_1(u) \end{bmatrix} [w_0(u) \ w_1(u)] \begin{bmatrix} s_0(u) \\ s_{L_0-1}(u) \end{bmatrix}.$$

The interference signal for the user u is:

$$\begin{bmatrix} I_0(u) \\ I_1(u) \end{bmatrix} = \begin{bmatrix} h_0(u) \\ h_1(u) \end{bmatrix}$$

$$[w_0(0), \dots, w_0(l), w_{L_l-1}(l), \dots, w_{L_{K-1}-1}(K-1)]_{l \neq u} \begin{bmatrix} s_0(0) \\ \vdots \\ s_0(l) \\ s_{L_l-1}(l) \\ \vdots \\ s_{L_{K-1}-1}(K-1) \end{bmatrix}_{l \neq u}$$

In order for the DL beamforming weights to enhance the desired user signal and reduce the interference to other users, a typical DL beamforming weights generation algorithm is zero-forcing beamforming weights. Its key idea is to let each $I_l(u)=0$, $\forall l, u$ by setting $$W = H^H(HH^H)^{-1},$$

which implies that $$\begin{bmatrix} h_0(u) \\ h_1(u) \end{bmatrix} [w_0(0), \dots, w_0(l), w_{L_l-1}(l), \dots, w_{L_{K-1}-1}(K-1)]_{l \neq u} = 0.$$

The present disclosure proposes an improved solution for beam control. The solution may be applied to a communication system including a terminal device and an access network node. For example, the access network node may be a base station such as an eNB in LTE or a gNB in NR. The terminal device can communicate through a radio access communication link with the base station. The base station can provide radio access communication links to terminal devices that are within its communication service cell. Note that the communications may be performed between the terminal device and the base station according to any suitable communication standards and protocols.

The terminal device may also be referred to as, for example, device, access terminal, user equipment (UE), mobile station, mobile unit, subscriber station, or the like. It may refer to any end device that can access a wireless communication network and receive services therefrom. By way of example and not limitation, the terminal device may include a portable computer, an image capture terminal device such as a digital camera, a gaming terminal device, a music storage and playback appliance, a mobile phone, a cellular phone, a smart phone, a tablet, a wearable device, a personal digital assistant (PDA), or the like.

In an Internet of things (IoT) scenario, a terminal device may represent a machine or other device that performs monitoring and/or measurements, and transmits the results of such monitoring and/or measurements to another terminal device and/or a network equipment. In this case, the terminal device may be a machine-to-machine (M2M) device, which may, in a 3GPP context, be referred to as a machine-type communication (MTC) device. Particular examples of such machines or devices may include sensors, metering devices such as power meters, industrial machineries, bikes, vehicles, or home or personal appliances, e.g. refrigerators, televisions, personal wearables such as watches, and so on.

Figure 5:
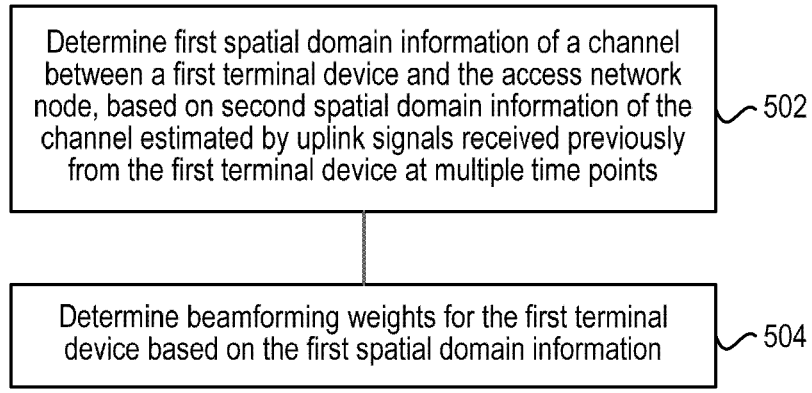
FIG. 5 is a flowchart illustrating a method implemented at an access network node according to an embodiment of the disclosure.

Hereinafter, the solution will be described in detail with reference to FIGS. 5-20. FIG. 5 is a flowchart illustrating a method implemented at an access network node according to an embodiment of the disclosure. At block 502, the access network node determines first spatial domain information of a channel between a first terminal device and the access network node, based on second spatial domain information of the channel estimated by uplink signals received previously from the first terminal device at multiple time points. The second spatial domain formation may also be referred to as historic or past spatial domain information of the channel. The word "historic" or "past" is mentioned relative to the time at which the first spatial domain information is determined. The first spatial domain information may also be referred to as predicted spatial domain information which is to be used by the access network node for beamforming. As an exemplary example, the uplink signals may be SRSs. Correspondingly, the second spatial domain information may be multiple channel vectors estimated by the SRSs received previously from the first terminal device at multiple time points. Thus, multiple snap shots of the spatial domain information of the channel are collected in time domain. As an exemplary example, recent 10 times of the spatial domain information estimated by SRSs may be collected.

Figure 6A:
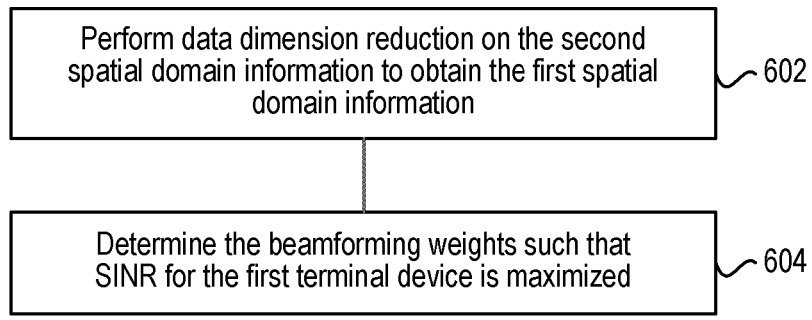
FIGS. 6A-6B are flowcharts each illustrating a method implemented at an access network node according to an embodiment of the disclosure.
Figure 6B:
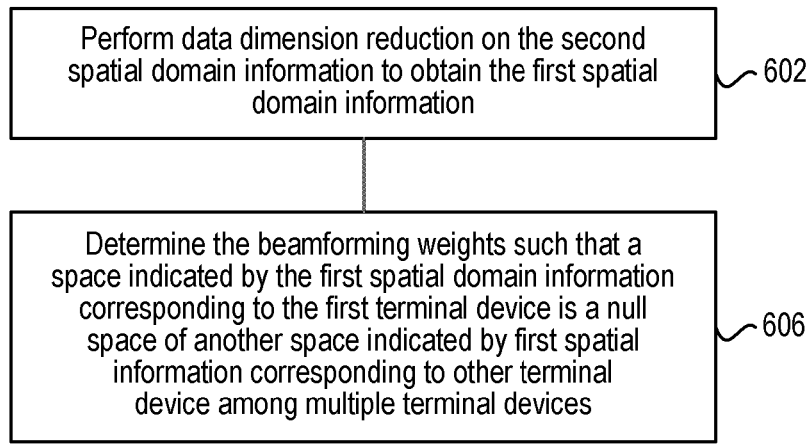

For example, block 502 may be implemented as block 602 of FIGS. 6A-6B. At block 602, the access network node performs data dimension reduction (or data dimensionality reduction) on the second spatial domain information such that the first spatial domain information is obtained. The data dimension reduction may refer to the process of reducing the number of variables under consideration by obtaining a set of principal variables. As an option, principal component analysis (PCA) may be used. For example, $s_u$ principal components may be obtained from the last $r_u$ estimated SRS channels by using PCA. The number of the principle components may be predefined as a fixed value equaling to one or more than one. Alternatively, it may also be determined based on the mobility level of the first terminal device, the SRS period configuration, the antenna configuration, or the like, which will be described later. As another option, support vector machine (SVM) or kernel based compression may be used. For example, suppose the first terminal device has m antennas and the access network node has n antennas. Then, the second spatial domain information of the channel may be viewed as an image having m*n pixels. Various SVM or kernel based image compression techniques may be used to compress the channel space. Note that the present disclosure is not limited to the above examples and various other existing or future developed data dimension reduction techniques may be used.

At block 504, the access network node determines beamforming weights for the first terminal device based on the first spatial domain information. For example, block 504 may be implemented as block 604 of FIG. 6A or block 606 of FIG. 6B. At block 604, the access network node determines the beamforming weights such that SINR for the first terminal device is maximized. This typically corresponds to performing SU-MIMO for the first terminal device. Various techniques for determining beamforming weights for SU-MIMO may be used in conjunction with the first spatial domain information.

At block 606, the access network node determines the beamforming weights such that a space indicated by the first spatial domain information corresponding to the first terminal device is a null space of another space indicated by first spatial information corresponding to other terminal device among multiple terminal devices including the first terminal device. The term "other terminal device" may refer to any other terminal device among the multiple terminal devices besides the first terminal device. If the number of the multiple terminal devices is two, the space indicated by the first spatial domain information corresponding to the first terminal device is a null space of another space indicated by first spatial information corresponding to the other terminal device. If the number of the multiple terminal devices is more than two, the space indicated by the first spatial domain information corresponding to the first terminal device is a null space of spaces indicated by first spatial information corresponding to the remaining terminal devices.

Block 606 typically corresponds to performing MU-MIMO for the multiple terminal devices. For the MU-MIMO case, the access network node may determine the first spatial domain information and determine the beamforming weights for each of the multiple terminal devices. The space indicated by the first spatial domain information corresponding to each terminal device may be used as a layer of MU-MIMO. For example, suppose $s_u$ principal components are obtained from the last $r_u$ estimated SRS channels. Then, for the first terminal device, its current-TTI channel span space $C_u$ by the $s_u$ principal components has the dimension of $N \times s_u$. The beamforming weights for the first terminal device may be determined to lie in the null space of the channel span spaces of all the other layers of signals, i.e., $$W_u \subseteq \mathrm{null}([C_0 C_1 \ldots C_{u-1} C_{u+1} \ldots C_{U-1}]).$$

Figure 7:
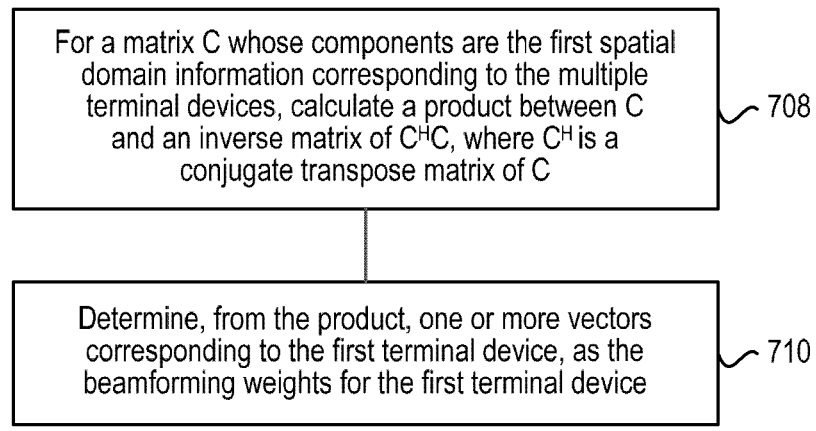
FIG. 7 is a flowchart for explaining the method of FIG. 6B.

As an exemplary example, block 606 may be implemented as blocks 708-710 of FIG. 7. At block 708, for a matrix C whose components are the first spatial domain information corresponding to the multiple terminal devices, the access network node calculates a product between C and an inverse matrix of $C^H C$, where $C^H$ is a conjugate transpose matrix of C. At block 710, the access network node determines, from the product, one or more vectors corresponding to the first terminal device, as the beamforming weights for the first terminal device. For example, define:

$$[C \triangleq C_0 C_1 \ldots C_{U-2} C_{u-1}]$$

Then, the beamforming weights can be obtained as:

$$[D_0 D_1 \ldots D_{U-2} D_{U-1}]^T = C(C^H C)^{-1},$$

$$W_u \subseteq \mathrm{span}(D_u), u=0,1,\ldots,U-1.$$

In this way, the beamforming weights can be obtained for all the multiple terminal devices by just one matrix inversion operation. With the method of FIG. 5, no matter whether SU-MIMO or MU-MIMO is performed, the performance (or spatial precoding) of the beam for the first terminal device can be improved.

Figure 8:
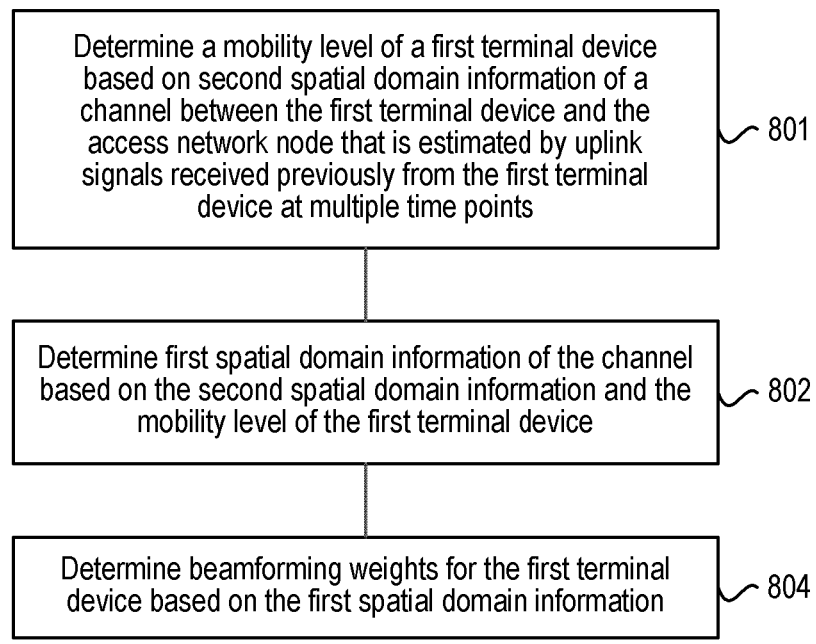
FIG. 8 is a flowchart illustrating a method implemented at an access network node according to an embodiment of the disclosure.
Figure 9:
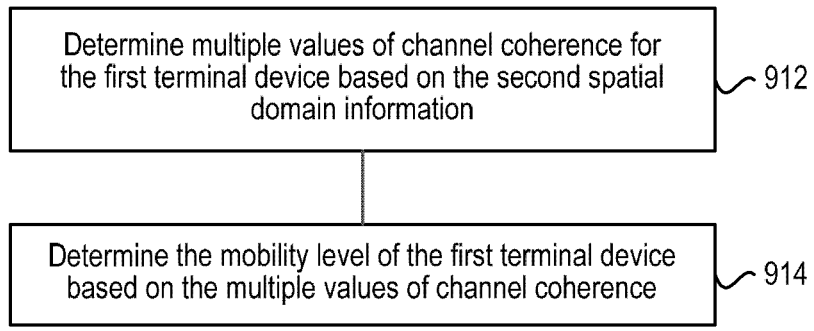
FIG. 9 is a flowchart for explaining the method of FIG. 8.
Figure 10:
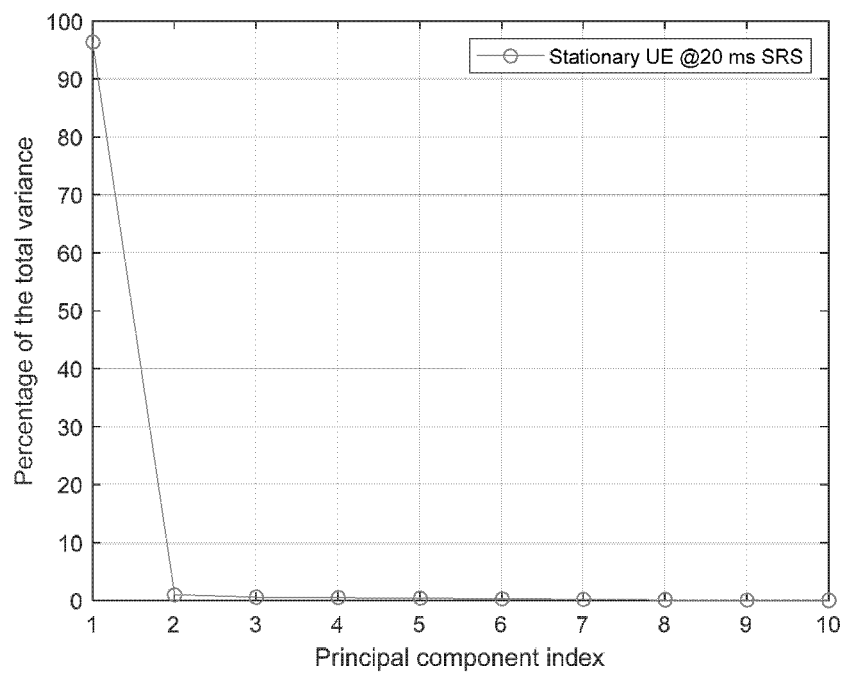
FIG. 10 is a diagram illustrating an example of data dimension reduction.
Figure 11:
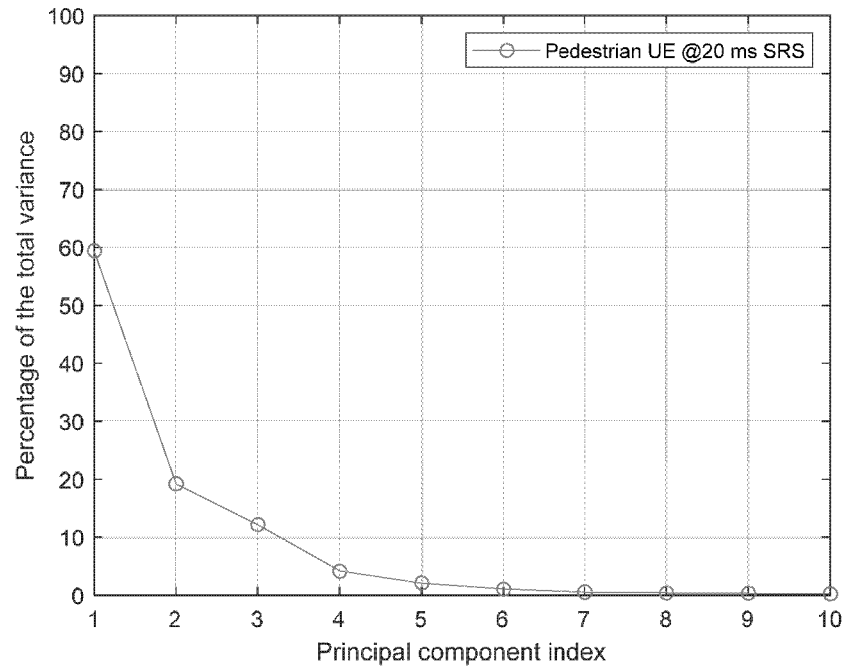
FIG. 11 is a diagram illustrating another example of data dimension reduction.
Figure 12:
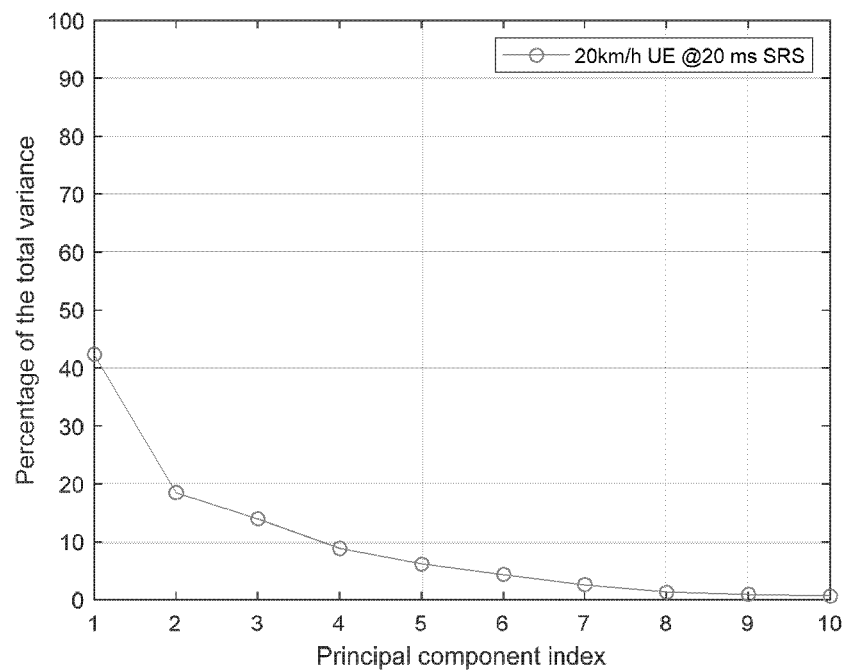
FIG. 12 is a diagram illustrating another example of data dimension reduction.

FIG. 8 is a flowchart illustrating a method implemented at an access network node according to an embodiment of the disclosure. At block 801, the access network node determines a mobility level of the first terminal device based on second spatial domain information of a channel between the first terminal device and the access network node. The second spatial domain information is estimated by uplink signals received previously from the first terminal device at multiple time points. For example, block 801 may be implemented as blocks 912-914 of FIG. 9. At block 912, the access network node determines multiple values of channel coherence for the first terminal device based on the second spatial domain information. In the case where the second spatial domain information is represented by multiple channel vectors, the multiple values of channel coherence may be calculated according to the formula described hereinbefore.

At block 914, the access network node determines the mobility level of the first terminal device based on the multiple values of channel coherence. As an option, the mobility level of the first terminal device may be determined based on a probability at which the channel coherence is above a predetermined channel coherence. As an exemplary example, if the probability is smaller than a first predetermined threshold, the first terminal device may be determined to move with a vehicle speed or higher speed. If the probability is above the first predetermined threshold and smaller than a second predetermined threshold, the first terminal device may be determined to move with a pedestrian speed. If the probability is above the second predetermined threshold, the first terminal device may be determined to be stationary. Note that more or less mobility level may be determined based on the multiple values of channel coherence.

For example, the layer 2 (L2) module of the access network node may store the last $N_1$ channel coherence $ρ_u(t,k)$, where $t=T_c−(N_1−1)Δt, T_c−(N_1−2)Δt, \ldots, T_c$, and $T_c$ is the current SRS time slot. Then, the L2 module may calculate the probability $K_u \triangleq \Pr(ρ_u(t,k) \geq 0.9)$. If $K_u < Th_1$, then the UE may be regarded as a "20 km/h" UE. If $Th_1 \leq K_u < Th_2$, then the UE may be regarded as a pedestrian UE. If $K_u \geq Th_2$, then the UE may be regarded as a stationary UE.

Referring back to FIG. 8, at block 802, the access network node determines first spatial domain information of the channel based on the second spatial domain information and the mobility level of the first terminal device. For example, the dimension (or dimension reduction level) of the first spatial domain information may be increased as the mobility level of the first terminal device increases.

Optionally, the first spatial domain information may be determined based further on a configuration about SRS period. The dimension of the first spatial domain information may be increased as the SRS period of the first terminal device is increased. Optionally, the first spatial domain information may be determined based further on a configuration about an antenna array of the access network node. The dimension of the first spatial domain information may be increased as the number of antenna elements contained in the antenna array is increased. Optionally, the above factors may also be considered in any combination to determine the dimension of the first spatial domain information.

To verify the effectiveness, for a UE in a certain mobility level (or category), PCA was used to obtain $s_u$ principal components from the last $r_u$ estimated SRS channels. The dimension $r_u$ before the dimension reduction (or compression) and the dimension $s_u$ after the compression were based on the UE mobility level, antenna configuration, and SRS period configuration. It was found that over 95% power of the next SRS estimated channel lies in the space spanned by the PCA-based compressed spatial domain information.

As the first case, a stationary UE with 20 ms SRS period was considered, where $r_u=10$ and $N=64$ were taken as an example. The percentage of the total variance explained by each principal component was illustrated in FIG. 10. It could be found that the first principal component is dominant. That means about 96% power of the next SRS estimated channel lies in the space spanned by the first principal component.

As the second case, a pedestrian UE with 20 ms SRS period was considered, where $r_u=10$ and $N=64$ were taken as an example. The percentage of the total variance explained by each principal component was illustrated in FIG. 11. It could be found that the first 4 principal components are dominant. That means about 95% power of the next SRS estimated channel lies in the space spanned by the first 4 principal components.

As the third case, a "20 km/h" UE with 20 ms SRS period was considered, where $r_u=10$ and $N=64$ were taken as an example. The percentage of the total variance explained by each principal component was illustrated in FIG. 12. It could be found that the first 6 principal components are dominant. That means 95% power of the next SRS estimated channel lies in the space spanned by the first principal 6 components. Note that for different UE scenarios, different antenna configurations and different SRS period configurations, $s_u$ and $r_u$ can be configured as different values.

Referring back to FIG. 8, at block 804, the access network node determines beamforming weights for the first terminal device based on the first spatial domain information. Block 804 may be implemented in the same way as block 504 and its details are omitted here.

As an exemplary example, to deal with MU-MIMO in the "pedestrian UE" scenario and the "20 km/h UE" (or even higher speed) scenario, instead of using one-snap-shot (or to say, the latest SRS detected) spatial domain information in legacy MU-MIMO implementation, an L2 scheduling algorithm described above with reference to FIG. 9 may be used first to determine the UE speed so as to classify UEs into three categories: stationary UE, pedestrian UE, and "20 km/h" UE (or "moving-in-car" UE). Then, a PCA-based compression method may be used. The dimension after the compression may be based on the UE speed, antenna configuration and SRS period configuration. Finally, the MU-MIMO beamforming weights may be obtained for each layer by nulling all the other dimensions of other layers of signals.

In the above example, one layer of signal may occupy multiple dimensions of subspace determined by PCA, rather than the traditional one dimension of subspace. It can overcome the problem in MU-MIMO that the configured SRS period is longer than the real channel coherence time. With the above example, the moving UE is able to be an MU candidate for MU-MIMO without too much throughput degrade.

Note that in the existing solution, $s_u$ is always 1 while $s_u$ is flexible in the method of FIG. 8. This indicates that one layer of signal may occupy multiple dimensions of subspace. Usually in the product, there is a limitation when calculating $(C^H C)^{-1}$ in the method of FIG. 7. Therefore, there is a constraint expressed as:

$$\sum_{u=0}^{U-1} s_u \leq L_{max},$$

where $L_{max}$ is the maximum size of matrix that can be allowed for matrix inversion in the product. The MU-MIMO layer number may decrease when allocating moving UEs comparing with only stationary UEs.

Figure 13:
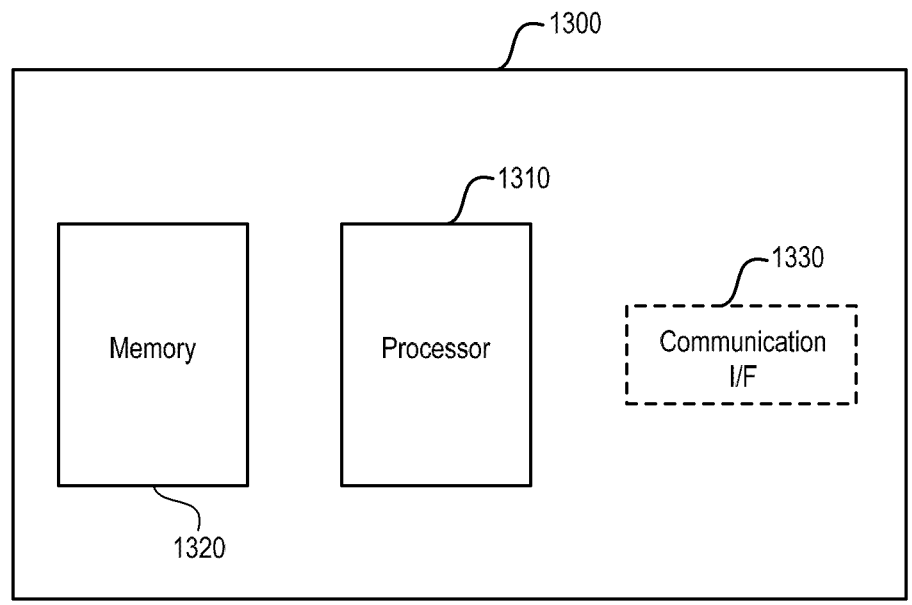
FIG. 13 is a block diagram showing an apparatus suitable for use in practicing some embodiments of the disclosure.

FIG. 13 is a block diagram showing an apparatus suitable for use in practicing some embodiments of the disclosure. For example, the access network node described above may be implemented through the apparatus 1300. As shown, the apparatus 1300 may include a processor 1310, a memory 1320 that stores a program, and optionally a communication interface 1330 for communicating data with other external devices through wired and/or wireless communication.

The program includes program instructions that, when executed by the processor 1310, enable the apparatus 1300 to operate in accordance with the embodiments of the present disclosure, as discussed above. That is, the embodiments of the present disclosure may be implemented at least in part by computer software executable by the processor 1310, or by hardware, or by a combination of software and hardware.

The memory 1320 may be of any type suitable to the local technical environment and may be implemented using any suitable data storage technology, such as semiconductor based memory devices, flash memories, magnetic memory devices and systems, optical memory devices and systems, fixed memories and removable memories. The processor 1310 may be of any type suitable to the local technical environment, and may include one or more of general purpose computers, special purpose computers, microprocessors, digital signal processors (DSPs) and processors based on multi-core processor architectures, as non-limiting examples.

Figure 14:
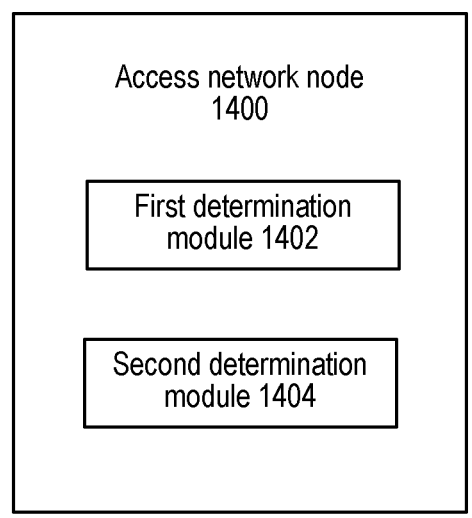
FIG. 14 is a block diagram showing an access network node according to an embodiment of the disclosure.

FIG. 14 is a block diagram showing an access network node according to an embodiment of the disclosure. As shown, the access network node 1400 comprises a first determination module 1402 and a second determination module 1404. The first determination module 1402 may be configured to determine first spatial domain information of a channel between a first terminal device and the access network node, based on second spatial domain information of the channel estimated by uplink signals received previously from the first terminal device at multiple time points, as described above with respect to block 502. The second determination module 1404 may be configured to determine beamforming weights for the first terminal device based on the first spatial domain information, as described above with respect to block 504. The modules described above may be implemented by hardware, or software, or a combination of both.

Figure 15:
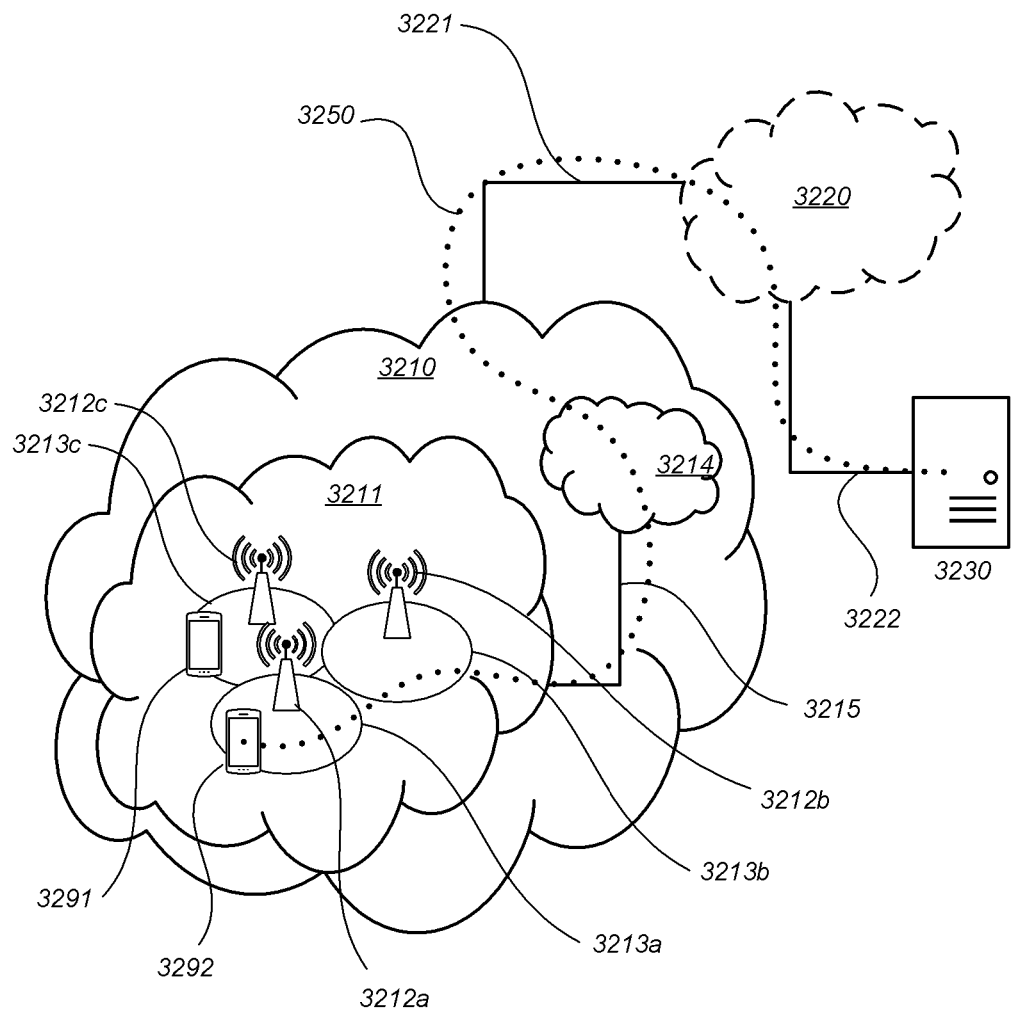
FIG. 15 is a diagram showing a telecommunication network connected via an intermediate network to a host computer in accordance with some embodiments.

With reference to FIG. 15, in accordance with an embodiment, a communication system includes telecommunication network 3210, such as a 3GPP-type cellular network, which comprises access network 3211, such as a radio access network, and core network 3214. Access network 3211 comprises a plurality of base stations 3212a, 3212b, 3212c, such as NBs, eNBs, gNBs or other types of wireless access points, each defining a corresponding coverage area 3213a, 3213b, 3213c. Each base station 3212a, 3212b, 3212c is connectable to core network 3214 over a wired or wireless connection 3215. A first UE 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

Telecommunication network 3210 is itself connected to host computer 3230, which may be embodied in the hardware and/or software of a standalone server, a cloud-implemented server, a distributed server or as processing resources in a server farm. Host computer 3230 may be under the ownership or control of a service provider, or may be operated by the service provider or on behalf of the service provider. Connections 3221 and 3222 between telecommunication network 3210 and host computer 3230 may extend directly from core network 3214 to host computer 3230 or may go via an optional intermediate network 3220. Intermediate network 3220 may be one of, or a combination of more than one of, a public, private or hosted network; intermediate network 3220, if any, may be a backbone network or the Internet; in particular, intermediate network 3220 may comprise two or more sub-networks (not shown).

The communication system of FIG. 15 as a whole enables connectivity between the connected UEs 3291, 3292 and host computer 3230. The connectivity may be described as an over-the-top (OTT) connection 3250. Host computer 3230 and the connected UEs 3291, 3292 are configured to communicate data and/or signaling via OTT connection 3250, using access network 3211, core network 3214, any intermediate network 3220 and possible further infrastructure (not shown) as intermediaries. OTT connection 3250 may be transparent in the sense that the participating communication devices through which OTT connection 3250 passes are unaware of routing of uplink and downlink communications. For example, base station 3212 may not or need not be informed about the past routing of an incoming downlink communication with data originating from host computer 3230 to be forwarded (e.g., handed over) to a connected UE 3291. Similarly, base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 16. In communication system 3300, host computer 3310 comprises hardware 3315 including communication interface 3316 configured to set up and maintain a wired or wireless connection with an interface of a different communication device of communication system 3300. Host computer 3310 further comprises processing circuitry 3318, which may have storage and/or processing capabilities. In particular, processing circuitry 3318 may comprise one or more programmable processors, application-specific integrated circuits, field programmable gate arrays or combinations of these (not shown) adapted to execute instructions. Host computer 3310 further comprises software 3311, which is stored in or accessible by host computer 3310 and executable by processing circuitry 3318. Software 3311 includes host application 3312. Host application 3312 may be operable to provide a service to a remote user, such as UE 3330 connecting via OTT connection 3350 terminating at UE 3330 and host computer 3310. In providing the service to the remote user, host application 3312 may provide user data which is transmitted using OTT connection 3350.

Communication system 3300 further includes base station 3320 provided in a telecommunication system and comprising hardware 3325 enabling it to communicate with host computer 3310 and with UE 3330. Hardware 3325 may include communication interface 3326 for setting up and maintaining a wired or wireless connection with an interface of a different communication device of communication system 3300, as well as radio interface 3327 for setting up and maintaining at least wireless connection 3370 with UE 3330 located in a coverage area (not shown in FIG. 16) served by base station 3320. Communication interface 3326 may be configured to facilitate connection 3360 to host computer 3310. Connection 3360 may be direct or it may pass through a core network (not shown in FIG. 16) of the telecommunication system and/or through one or more intermediate networks outside the telecommunication system. In the embodiment shown, hardware 3325 of base station 3320 further includes processing circuitry 3328, which may comprise one or more programmable processors, application-specific integrated circuits, field programmable gate arrays or combinations of these (not shown) adapted to execute instructions. Base station 3320 further has software 3321 stored internally or accessible via an external connection.

Communication system 3300 further includes UE 3330 already referred to. Its hardware 3335 may include radio interface 3337 configured to set up and maintain wireless connection 3370 with a base station serving a coverage area in which UE 3330 is currently located. Hardware 3335 of UE 3330 further includes processing circuitry 3338, which may comprise one or more programmable processors, application-specific integrated circuits, field programmable gate arrays or combinations of these (not shown) adapted to execute instructions. UE 3330 further comprises software 3331, which is stored in or accessible by UE 3330 and executable by processing circuitry 3338. Software 3331 includes client application 3332. Client application 3332 may be operable to provide a service to a human or non-human user via UE 3330, with the support of host computer 3310. In host computer 3310, an executing host application 3312 may communicate with the executing client application 3332 via OTT connection 3350 terminating at UE 3330 and host computer 3310. In providing the service to the user, client application 3332 may receive request data from host application 3312 and provide user data in response to the request data. OTT connection 3350 may transfer both the request data and the user data. Client application 3332 may interact with the user to generate the user data that it provides.

Figure 16:
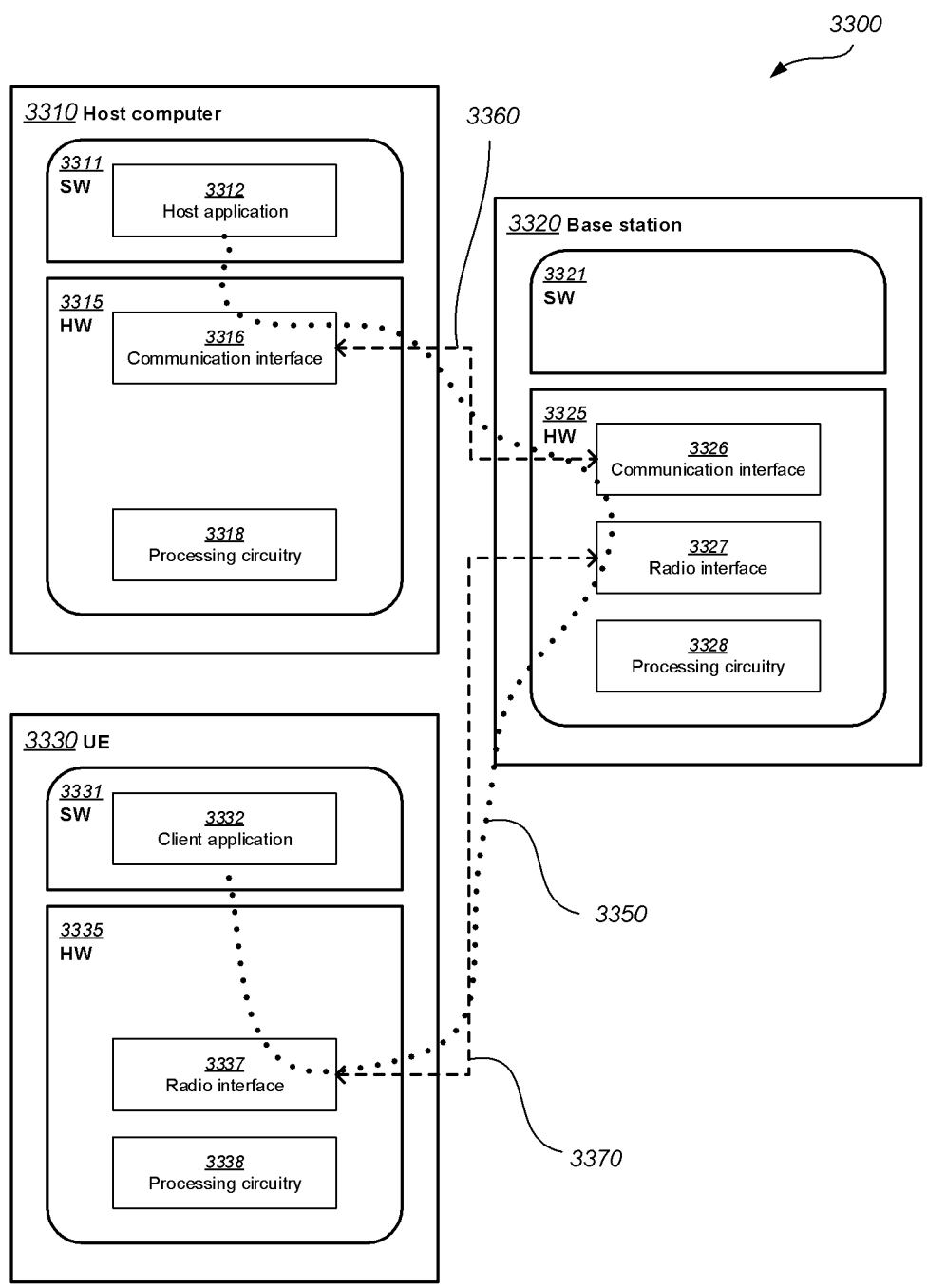
FIG. 16 is a diagram showing a host computer communicating via a base station with a user equipment in accordance with some embodiments.

It is noted that host computer 3310, base station 3320 and UE 3330 illustrated in FIG. 16 may be similar or identical to host computer 3230, one of base stations 3212a, 3212b, 3212c and one of UEs 3291, 3292 of FIG. 15, respectively. This is to say, the inner workings of these entities may be as shown in FIG. 16 and independently, the surrounding network topology may be that of FIG. 15.

In FIG. 16, OTT connection 3350 has been drawn abstractly to illustrate the communication between host computer 3310 and UE 3330 via base station 3320, without explicit reference to any intermediary devices and the precise routing of messages via these devices. Network infrastructure may determine the routing, which it may be configured to hide from UE 3330 or from the service provider operating host computer 3310, or both. While OTT connection 3350 is active, the network infrastructure may further take decisions by which it dynamically changes the routing (e.g., on the basis of load balancing consideration or reconfiguration of the network).

Wireless connection 3370 between UE 3330 and base station 3320 is in accordance with the teachings of the embodiments described throughout this disclosure. One or more of the various embodiments improve the performance of OTT services provided to UE 3330 using OTT connection 3350, in which wireless connection 3370 forms the last segment. More precisely, the teachings of these embodiments may improve the throughput and thereby provide benefits such as reduced user waiting time.

A measurement procedure may be provided for the purpose of monitoring data rate, latency and other factors on which the one or more embodiments improve. There may further be an optional network functionality for reconfiguring OTT connection 3350 between host computer 3310 and UE 3330, in response to variations in the measurement results. The measurement procedure and/or the network functionality for reconfiguring OTT connection 3350 may be implemented in software 3311 and hardware 3315 of host computer 3310 or in software 3331 and hardware 3335 of UE 3330, or both. In embodiments, sensors (not shown) may be deployed in or in association with communication devices through which OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of OTT connection 3350 may include message format, retransmission settings, preferred routing etc.; the reconfiguring need not affect base station 3320, and it may be unknown or imperceptible to base station 3320. Such procedures and functionalities may be known and practiced in the art. In certain embodiments, measurements may involve proprietary UE signaling facilitating host computer 3310's measurements of throughput, propagation times, latency and the like. The measurements may be implemented in that software 3311 and 3331 causes messages to be transmitted, in particular empty or 'dummy' messages, using OTT connection 3350 while it monitors propagation times, errors etc.

Figure 17:
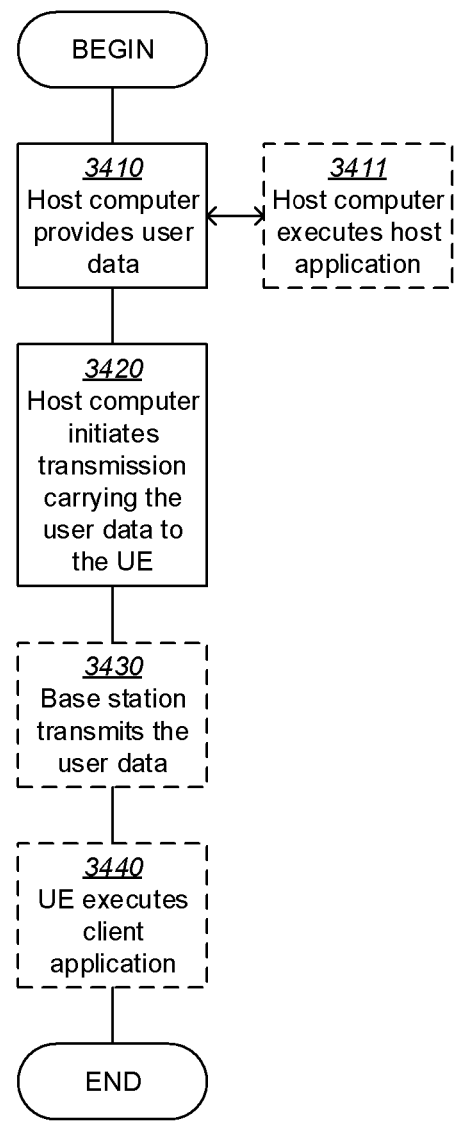
FIG. 17 is a flowchart illustrating a method implemented in a communication system in accordance with some embodiments.

FIG. 17 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 17 will be included in this section. In step 3410, the host computer provides user data. In substep 3411 (which may be optional) of step 3410, the host computer provides the user data by executing a host application. In step 3420, the host computer initiates a transmission carrying the user data to the UE. In step 3430 (which may be optional), the base station transmits to the UE the user data which was carried in the transmission that the host computer initiated, in accordance with the teachings of the embodiments described throughout this disclosure. In step 3440 (which may also be optional), the UE executes a client application associated with the host application executed by the host computer.

Figure 18:
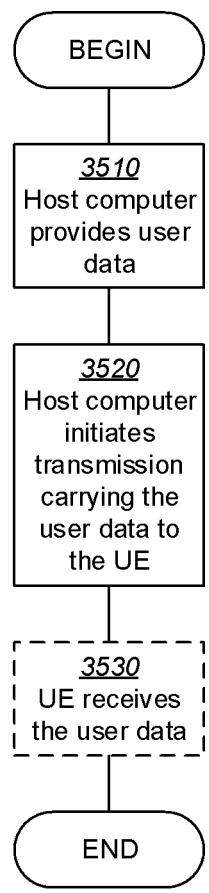
FIG. 18 is a flowchart illustrating a method implemented in a communication system in accordance with some embodiments.

FIG. 18 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 18 will be included in this section. In step 3510 of the method, the host computer provides user data. In an optional substep (not shown) the host computer provides the user data by executing a host application. In step 3520, the host computer initiates a transmission carrying the user data to the UE. The transmission may pass via the base station, in accordance with the teachings of the embodiments described throughout this disclosure. In step 3530 (which may be optional), the UE receives the user data carried in the transmission.

Figure 19:
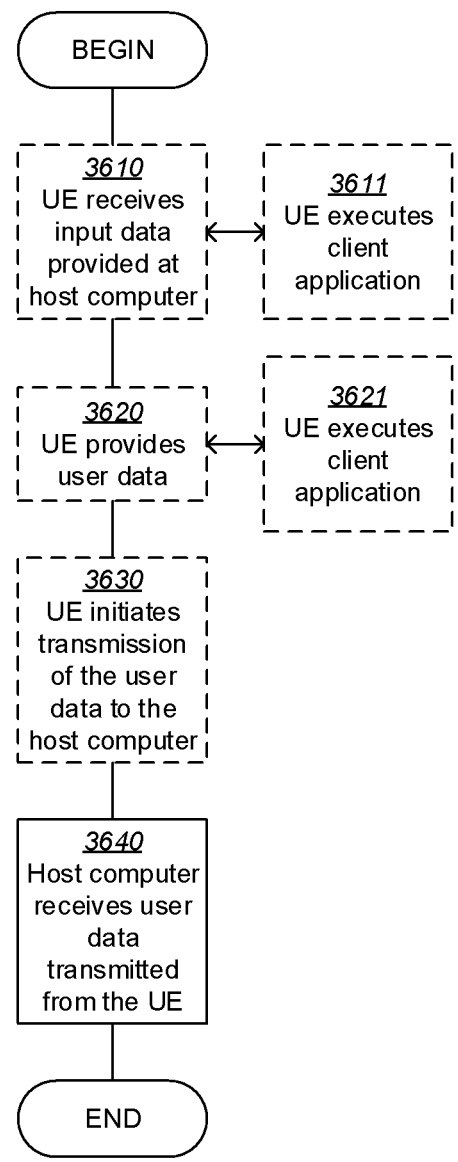
FIG. 19 is a flowchart illustrating a method implemented in a communication system in accordance with some embodiments.

FIG. 19 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 19 will be included in this section. In step 3610 (which may be optional), the UE receives input data provided by the host computer. Additionally or alternatively, in step 3620, the UE provides user data. In substep 3621 (which may be optional) of step 3620, the UE provides the user data by executing a client application. In substep 3611 (which may be optional) of step 3610, the UE executes a client application which provides the user data in reaction to the received input data provided by the host computer. In providing the user data, the executed client application may further consider user input received from the user. Regardless of the specific manner in which the user data was provided, the UE initiates, in substep 3630 (which may be optional), transmission of the user data to the host computer. In step 3640 of the method, the host computer receives the user data transmitted from the UE, in accordance with the teachings of the embodiments described throughout this disclosure.

Figure 20:
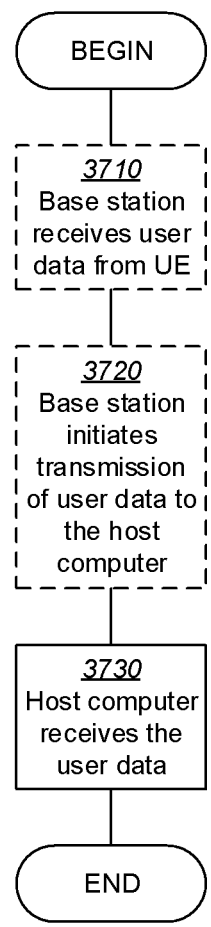
FIG. 20 is a flowchart illustrating a method implemented in a communication system in accordance with some embodiments.

FIG. 20 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 20 will be included in this section. In step 3710 (which may be optional), in accordance with the teachings of the embodiments described throughout this disclosure, the base station receives user data from the UE. In step 3720 (which may be optional), the base station initiates transmission of the received user data to the host computer. In step 3730 (which may be optional), the host computer receives the user data carried in the transmission initiated by the base station.

According to an aspect of the disclosure, there is provided a method implemented in a communication system including a host computer, a base station and a terminal device. The method may comprise, at the host computer, providing user data. The method may further comprise, at the host computer, initiating a transmission carrying the user data to the terminal device via a cellular network comprising the base station. The base station may determine first spatial domain information of a channel between a first terminal device and the access network node, based on second spatial domain information of the channel estimated by uplink signals received previously from the first terminal device at multiple time points. The base station may determine beamforming weights for the first terminal device based on the first spatial domain information.

In an embodiment of the disclosure, the method may further comprise, at the base station, transmitting the user data.

In an embodiment of the disclosure, the user data may be provided at the host computer by executing a host application. The method may further comprise, at the terminal device, executing a client application associated with the host application.

According to another aspect of the disclosure, there is provided a communication system including a host computer comprising processing circuitry configured to provide user data and a communication interface configured to forward the user data to a cellular network for transmission to a terminal device. The cellular network may comprise a base station having a radio interface and processing circuitry. The base station's processing circuitry may be configured to determine first spatial domain information of a channel between a first terminal device and the access network node, based on second spatial domain information of the channel estimated by uplink signals received previously from the first terminal device at multiple time points. The base station's processing circuitry may be further configured to determine beamforming weights for the first terminal device based on the first spatial domain information.

In an embodiment of the disclosure, the communication system may further include the base station.

In an embodiment of the disclosure, the communication system may further include the terminal device. The terminal device may be configured to communicate with the base station.

In an embodiment of the disclosure, the processing circuitry of the host computer may be configured to execute a host application, thereby providing the user data. The terminal device may comprise processing circuitry configured to execute a client application associated with the host application.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one skilled in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described. It should be noted that two blocks shown in succession in the figures may, in fact, be executed substantially concurrently, or the blocks may sometimes be executed in the reverse order, depending upon the functionality involved.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method performed by an access network node, comprising:
   determining first spatial domain information of a channel between a first terminal device and the access network node, based on second spatial domain information of the channel estimated by uplink signals received previously from the first terminal device at multiple time points; and
   determining beamforming weights for the first terminal device based on the first spatial domain information.

2. The method according to claim 1, wherein determining the first spatial domain information comprises:
   performing data dimension reduction on the second spatial domain information such that the first spatial domain information is obtained.

3. The method according to claim 1, further comprising:
   determining a mobility level of the first terminal device based on the second spatial domain information; and
   wherein the first spatial domain information is determined based on the mobility level of the first terminal device.

4. The method according to claim 1, wherein the beamforming weights are determined such that signal to interference plus noise ratio (SINR) for the first terminal device is maximized.

5. The method according to claim 4, wherein the beamforming weights are used for performing single user multiple-input multiple-output (SU-MIMO) for the first terminal device.

6. The method according to claim 1, wherein the first terminal device is one of multiple terminal devices; and
   wherein the beamforming weights are determined such that a space indicated by the first spatial domain information corresponding to the first terminal device is a null space of another space indicated by first spatial information corresponding to other terminal device among the multiple terminal devices.

7. The method according to claim 6, wherein the determining of the first spatial domain information and the determining of the beamforming weights are performed for each of the multiple terminal devices.

8. The method according to claim 6, wherein the beamforming weights are used for performing multi-user MIMO (MU-MIMO) for the multiple terminal devices.

9. The method according to claim 3, wherein determining the mobility level of the first terminal device based on the second spatial domain information comprises:
   determining multiple values of channel coherence for the first terminal device based on the second spatial domain information; and
   determining the mobility level of the first terminal device based on the multiple values of channel coherence.

10. The method according to claim 9, wherein the mobility level of the first terminal device is determined based on a probability at which the channel coherence is above a predetermined channel coherence.

11. The method according to claim 10, wherein when the probability is smaller than a first predetermined threshold, the first terminal device is determined to move with a vehicle speed or higher speed;
    when the probability is above the first predetermined threshold and smaller than a second predetermined threshold, the first terminal device is determined to move with a pedestrian speed; and
    when the probability is above the second predetermined threshold, the first terminal device is determined to be stationary.

12. The method according to claim 3, wherein a dimension of the first spatial domain information is increased as the mobility level of the first terminal device increases.

13. The method according to claim 3, wherein the first spatial domain information is determined based further on at least one of:
    a configuration about sounding reference signal (SRS) period; and
    a configuration about an antenna array of the access network node.

14. The method according to claim 13, wherein a dimension of the first spatial domain information is increased as the SRS period of the first terminal device is increased; and/or
    wherein the dimension of the first spatial domain information is increased as a number of antenna elements contained in the antenna array is increased.

15. The method according to claim 1, wherein the first spatial domain information is determined by using at least one of: principal component analysis (PCA); and support vector machine (SVM) or kernel based compression.

16. The method according to claim 6, wherein determining the beamforming weights for the first terminal device comprises:
    for a matrix C whose components are the first spatial domain information corresponding to the multiple terminal devices, calculating a product between C and an inverse matrix of $C^H C$, where $C^H$ is a conjugate transpose matrix of C; and
    determining, from the product, one or more vectors corresponding to the first terminal device, as the beamforming weights for the first terminal device.

17. The method according to claim 1, wherein the uplink signals are sounding reference signals (SRSs).

18. The method according to claim 1, wherein the second spatial domain information is represented by multiple channel vectors.

19. An access network node comprising:
    at least one processor; and
    at least one memory, the at least one memory containing instructions executable by the at least one processor, whereby the access network node is operative to:
    determine first spatial domain information of a channel between a first terminal device and the access network node, based on second spatial domain information of the channel estimated by uplink signals received previously from the first terminal device at multiple time points; and
    determine beamforming weights for the first terminal device based on the first spatial domain information.

20. The access network node according to claim 19, wherein the instructions are executable by the at least one processor, whereby the access network node is operative to determine the first spatial domain information by:
   performing data dimension reduction on the second spatial domain information such that the first spatial domain information is obtained.

\* \* \* \* \*